DAVID LOTT.
Railway Car.

No. 49,126.

Patented Aug. 1, 1865.

Witnesses:

Inventor:

UNITED STATES PATENT OFFICE.

DANIEL LOTT, OF LOTTSVILLE, PENNSYLVANIA.

IMPROVEMENT IN REVOLVING CARS.

Specification forming part of Letters Patent No. 49,126, dated August 1, 1865.

*To all whom it may concern:*

Be it known that I, DANIEL LOTT, of Lottsville, in the county of Warren and State of Pennsylvania, have made certain new and useful Improvements in Revolving Cars, for carrying oil or other fluids, or solids if required; and I do hereby declare the following to be a full, clear, and exact description of the nature, construction, and operation of the same, reference being had to the annexed drawings, making part of this specification, and in which—

Figure 1:
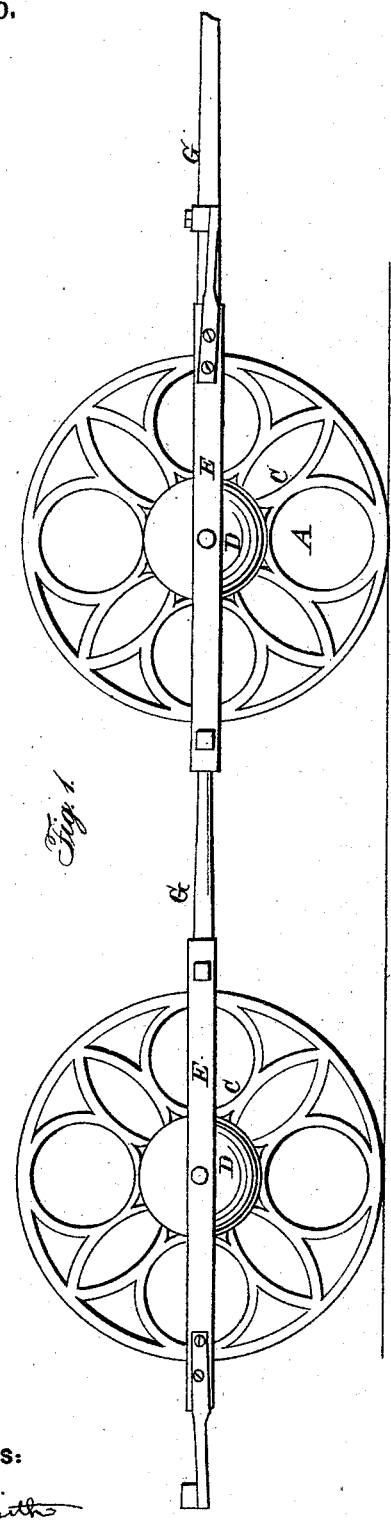
Figure 2:
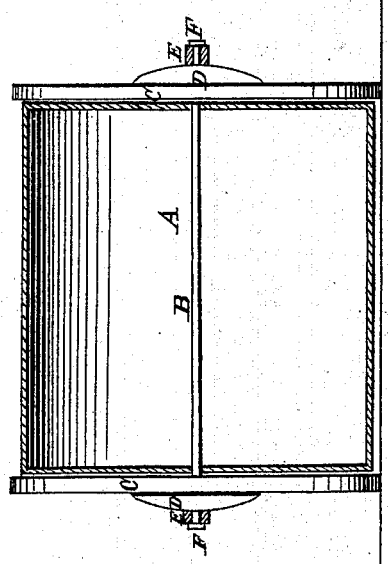

Figure 1 is a side elevation of two cars constructed on this plan. Fig. 2 is a central transverse section of one of the cars.

Similar letters of reference indicate corresponding parts in the two figures.

The object of the improvement is to throw the weight of the load contained in the receptacle immediately upon the wheel and allow it to rotate with the latter, so as to reduce the friction upon the axle.

A is a cylindrical receptacle attached to the axle B, which is supported upon the wheels C, which run loosely upon it, so as to enable the car to turn more easily to the right or the left than it would were they firmly attached to the axle. The wheels are secured by washers D between them and the frame E, outside of which latter are the nuts F on the ends of the axle.

The axles are journaled in the frame E, and the latter, which completely surrounds the rolling receptacle and its wheels, is drawn by means of a tongue, G, by which tongues several of such cars may be coupled behind each other. One object of this is to enable a team to be fully loaded where the road is favorable and to drop a portion (dividing the load) where the condition of the road renders it necessary, going back after the truck or trucks in the rear and coupling them together again at the favorable place. The axles in this car are only exposed to the friction due to the traction and the weight of the frame, and not to the weight of the load.

The receptacle has man-holes, plug-holes, or faucets for loading, discharge, or vent, and each is complete in itself. It is adapted to be used on an ordinary road-bottom or on a railroad, and is intended as a labor-saving device in the reduction of friction and trouble in handling fluids.

Having thus described my invention, what I claim therein as new, and desire to secure by Letters Patent, is—

The rolling receptacle A, mounted by a horizontal shaft, B, upon wheels C, which run freely upon the said shaft, and drawn by means of a frame in which the ends of the said shaft are journaled.

The above specification of my improved revolving car signed this 27th day of February, 1865.

DANIEL LOTT.

Witnesses:
OCTAVIUS KNIGHT,
ALEXR. A. C. KLAUCKE.